United States Patent
Merz

(10) Patent No.: US 7,538,940 B2
(45) Date of Patent: May 26, 2009

(54) TUBE FOR A MICROSCOPE AS WELL AS MICROSCOPE

(75) Inventor: Franz Merz, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 54 days.

(21) Appl. No.: 10/978,793

(22) Filed: Nov. 1, 2004

(65) Prior Publication Data

US 2005/0128573 A1 Jun. 16, 2005

(30) Foreign Application Priority Data

| Oct. 31, 2003 | (DE) | ................................ 103 51 082 |
| Oct. 4, 2004 | (DE) | ........................ 10 2004 048 234 |
| Oct. 19, 2004 | (DE) | ........................ 10 2004 050 893 |

(51) Int. Cl.
*G02B 21/32* (2006.01)

(52) U.S. Cl. ........................ 359/381; 359/431; 359/372; 359/374

(58) Field of Classification Search .................. 359/381, 359/431, 372, 374

See application file for complete search history.

(56) References Cited

U.S. PATENT DOCUMENTS

| 5,009,487 | A |   | 4/1991 | Reiner |
| 5,321,447 | A |   | 6/1994 | Sander et al. |
| 5,986,801 | A | * | 11/1999 | Volk et al. .................. 359/376 |
| 6,212,006 | B1 |   | 4/2001 | Reiner |
| 6,236,502 | B1 | * | 5/2001 | Kitajima ..................... 359/389 |
| 6,598,972 | B2 |   | 7/2003 | Strahle |
| 6,733,128 | B2 |   | 5/2004 | Kirchhuebel |
| 6,788,455 | B2 | * | 9/2004 | Kirchhuebel et al. ........ 359/381 |
| 2003/0165012 | A1 |   | 9/2003 | Straehle et al. |

FOREIGN PATENT DOCUMENTS

DE 3539009 A1 5/1987

* cited by examiner

*Primary Examiner*—Joshua L Pritchett
(74) *Attorney, Agent, or Firm*—Kriegsman & Kriegsman

(57) ABSTRACT

The invention concerns a tube (3) for a microscope (1), in which at least two beam paths are provided, wherein a change-over device is provided in the tube (3), by means of which device a first (5) or a second flat-field optical element can be rotated and/or moved selectively into the beam paths (2) of the beam paths (8) aligned by an objective (7), for aligning the beam paths for an observer, wherein the second flat-field optical element has a function of exchanging the beam paths and inverting the image. Further, the invention concerns a microscope (1) with such a tube (3).

21 Claims, 12 Drawing Sheets

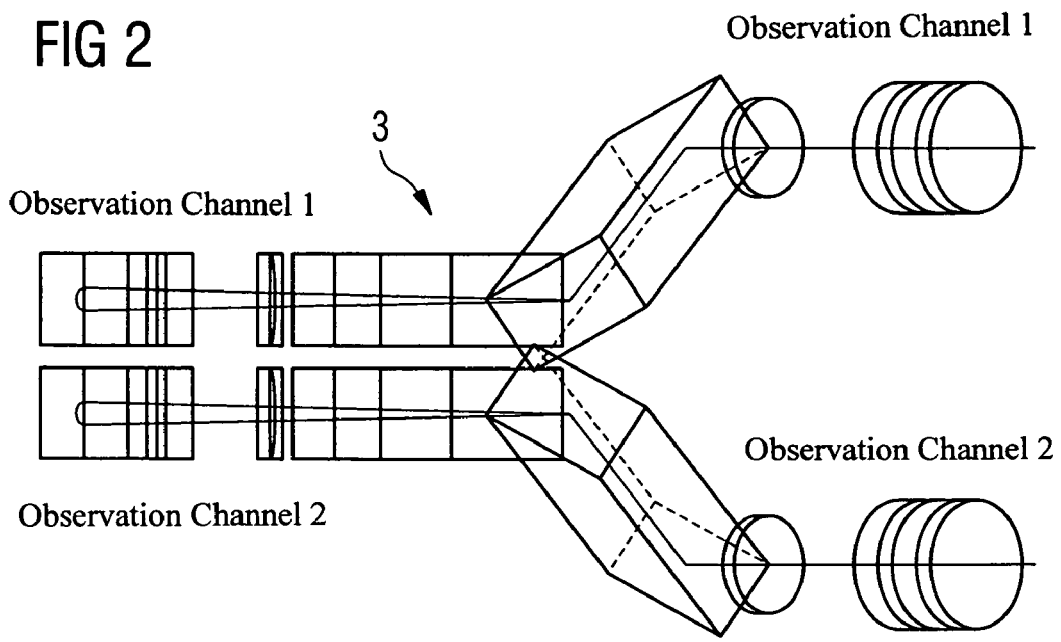
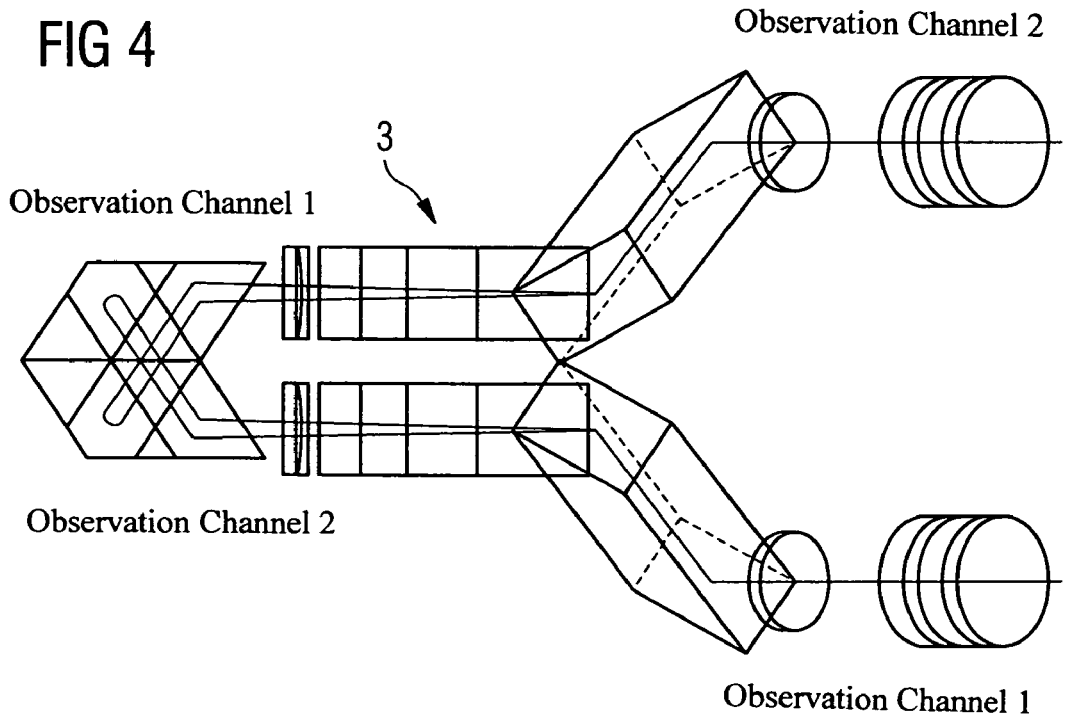

TUBE FOR A MICROSCOPE AS WELL AS MICROSCOPE

The present invention concerns first a tube for a microscope, in which at least two beam paths are provided. Further, the invention concerns a microscope for observing an object or an intermediate image produced by an object, in particular in microsurgery, with an objective for aligning th.e beam bundle which is introduced from the object or the intermediate image to be observed, with optics, in particular an ophthalmoscopic lens or an indirect contact glass that can be introduced into the beam path between objective and object, with at least one eyepiece arrangement by which the left and right beam paths introduced by the objective are introduced for observing the object or the intermediate image, with at least one tube having at least one flat-field optical element for aligning the beam paths for at least one observer, with a first flat-field optical element for aligning the beam paths for the observation of the front segment of the object as well as with a second flat-field optical element with the function of exchanging the beam paths and inverting the image, for aligning the beam paths in the observation of the intermediate image of the object.

In eye surgery, a distinction is made between operations on the front segment of the eye and on the back segment of the eye, the so-called fundus. In order to be able to observe the front segment of the eye and the back segment of the eye during the operation, different types of operating microscopes are utilized in eye surgery. Since the operating microscope cannot be changed during the operation, the operating microscope that is utilized must be designed so that it can be utilized both for observing the front segment of the eye as well as also the back segment of the eye.

The many different types of operating microscopes all provide eyepieces through which the surgeon can observe the eye to be operated on. Operating microscopes usually have a lens system with flat-field and round optical components. The objective is disposed between the eye to be observed and the body of the microscope.

When the back segment of the eye is observed, unlike when the front segment of the eye is observed, an additional optical element is required. The additional optical element is required in order to obtain a wide image angle. For example, an ophthalmoscopic lens, an indirect contact glass or the like can be used as the additional optical element. The additional optical element is positioned between the eye of the patient and the operating microscope itself, in particular, directly in front of the eye of the patient. The image of the back segment of the eye through the additional optical element is presented to the observer upside down and with inverted lateral positions. That is, an intermediate image, which produces an inverted image of the fundus with interchanged pupils arises between the additional optical element and the objective of the operating microscope.

In order not to present to the observer a laterally-inverted, upside-down and pupil-interchanged image of the back segment of the eye when the fundus is observed, an optical element is required which has the function of exchanging the beam paths and inverting the image, also called an inverter, which transforms the generated intermediate image back into the correct stereoscopic image of the fundus.

The prior art presents different operating microscopes, which are suitable for observing both the front region of the eye as well as the back region of the eye. An operating microscope with an inverter attachment module is known from DE 200 21,955 U1. This inverter attachment module comprises a system based on a prism construction for exchanging beam paths and inverting the image. The inverter attachment module is disposed underneath the principal objective of the operating microscope and makes possible a laterally correct representation of the fundus to an observer. When the fundus is observed, the inverter attachment module can be moved or rotated into the beam path of the operating microscope between the eye and the principal objective of the operating microscope. When the front segment of the eye is observed, the inverter attachment module is correspondingly removed from the beam path.

Operating microscopes are also known from DE 101 40,402 A1 and DE 101 46,971 A1, in which an inverter attachment can be introduced between the eye to be investigated and the principal objective of the operating microscope, if the observer would like to observe the back region of the eye. DE 101 40,402 A1 discloses an attachment module, which is connected to the tube with a bayonet fastener for rapid exchange. The attachment module comprises a system for exchanging the images and the beam path, a focussing optical component as well as an ophthalmoscopic lens. An attachment system is also known from DE 101 46,971 A1, which is mounted onto a microscope body and has optics for exchanging beam paths and inverting the image and an ophthalmoscopic lens. The optics for exchanging beam paths and inverting the image and the ophthalmoscopic lens can be rotated into the beam path of the microscope by means of a rotatable mount.

It is a disadvantage in the prior art described above that when an inverter attachment module, comprised of the corresponding prism system for inverting the image and exchanging beam paths, the ophthalmoscopic lens and in certain cases the focussing optical component is introduced, the working space for treating the eye is clearly reduced for the surgeon. In addition, due to the arrangement of the attachment, which can be rotated into place underneath the actual microscope body, the microscope structure is lengthened even when the operating space will remain sufficiently large in spite of the introduction of the attachment.

A similar approach is also disclosed, for example, in DE 41 14,646 A1, in which an ophthalmoscopic attachment is described for an operating microscope.

A stereoscopic microscope which has an inverter for inverting the image and for exchanging beam paths is also known from DE 299 05,969 U1. This inverter is in the form of an additional module disposed between the eyepiece and a magnification system of the microscope. In this known solution also, there is in turn the disadvantage that the ergonomics are adversely affected due to an increase in the viewing height. In addition, image failures can occur due to the additional structure. Finally, a special adjustment of the inverter is also necessary.

The object of the invention is to create a tube for a microscope, which is designed in such a way that it can be utilized for observing an object and an intermediate image produced by an object, and which nevertheless keeps small the structural height of the microscope. In addition, a microscope will be created in which the space between objective and object to be observed remains nearly unchanged in size when a flat-field optical element with the function of exchanging beam paths and inverting the image is moved into the beam paths, and in which the distance between eyepiece arrangement and object to be observed is as small as possible for the observer.

This object is solved by a tube with the features of claim 1 as well as by a microscope with the features of claim 15. Other advantages, features, details, aspects and effects of the invention result from the subclaims, the description, as well as the drawings. Features and details, which are described in connection with the tube according to the invention, thus also apply, obviously, to the microscope according to the invention, and vice versa.

A tube for a microscope, in which at least two beam paths are provided, whereby a change-over device is provided in the tube, by means of which a first or a second flat-field optical element can be rotated and/or moved selectively into the beam paths of the beam paths aligned by an objective, for aligning the beam paths for an observer, whereby the second flat-field optical element has a function of exchanging beam paths and inverting the image, represents a tube for a microscope that can be used for observing an object and an intermediate image produced by an object, and thus the structural height of the microscope is kept small.

Such a tube can be used for a microscope, advantageously in an operating microscope, in particular in eye surgery (a so-called ophthalmoscopic microscope). Due to the fact that a change-over optics is provided in the tube, by means of which a first or a second flat-field optical element can be introduced selectively into the beam paths, the so-called operating space of the microscope can be kept constant. During operation, preferably, one of the flat-field optical elements is always rotated or shifted into the beam paths. Another advantage results, for example, also in connection with ergonomics, since the viewing height does not change.

A first fundamental feature of the present invention consists of the fact that an inverter which is known from the prior art described above, is no longer designed as an attachment module that reduces the working space, but rather the inverter is now arranged inside the tube.

A tube generally involves a subassembly in a microscope, for example in an operating microscope, in which one or more eyepiece(s) is/are disposed, by means of which an operator can observe an intermediate image. Such tubes can be designed in different ways. For example, it may be provided that the tubes of the microscope, so-called viewing tubes, are configured as binocular tubes. A parallel observation beam path, for example, coming from a magnification system, can be introduced into these tubes. By means of suitable optical elements, for example, a tube lens system, the parallel observation beam path can be focussed relative to an intermediate image, which in turn can be infinitely imaged by the eyepiece or the eyepiece system arranged in the tube. In this way, the operator can observe the enlarged image of a region to be observed, for example, an operating field, with an eye adjustment that can be infinitely adjusted.

According to the invention, a first flat-field optical element and a second flat-field optical element are provided in the tube. A flat-field optical element according to the present invention involves an optical component which is formed by planar functional surfaces, wherein the functional surfaces are positioned at a specific angle to one another. A functional surface is thus generally understood to be a surface, in the region of which a specific functionality of the flat-field optical element is effected, for example, such as the transmission and/or reflection and/or refraction of a beam path. A flat-field optical element is characterized by planar surfaces.

The invention is basically not limited to specific embodiments for the flat-field optical elements. For example, these may involve plane-parallel plates, windows, prisms and prism systems (for example, cemented prism systems), rods, cubes, mirrors and mirror systems and the like. In the further course of the description, several nonexclusive examples are described for advantageous flat-field optical elements.

Suitable materials for flat-field optical elements can be, for example, optical glasses, quartz glass, crystals, ceramics, plastics and the like.

The first flat-field optical element, which is used in observing the front region of the eye, is exchanged for a second flat-field optical element with the function of exchanging the beam paths and inverting the image, which is required for observing the back segment of the eye, the so-called fundus. The optical element with the function of exchanging beam paths and inverting the image involves a so-called inverter.

The effect of a system for the function of exchanging beam paths and inverting the image employing flat-field optical elements will be explained in more detail below. The image is inverted in such a way that a parallel observation beam path is reflected at an odd number of optionally planar roof-type mirror surfaces and at an odd number of mirror surfaces. A roof-type mirror surface is comprised of two pairs of roof surfaces—particularly placed at an angle of 90 degrees relative to one another—which abut at the peak of the roof. In the counting of mirror surfaces, such a mirror roof-type surface represents only a single mirror surface. In order to also effect an exchanging of the beam for inverting the image, a lateral displacement of the observation beam path must be produced in such a system—e.g., by reflection. Several examples of systems with the function of exchanging beam paths and inverting the image are mentioned in DE 101 40,042 A1, which has already been described above, the disclosure content of which is incorporated in the description of the present invention.

Advantageously, it can also be provided that the flat-field optical element with the function of exchanging beam paths and inverting the image as well as the flat-field optical element without the function of exchanging beam paths and inverting the image have approximately the same optical wavelengths.

In contrast to the prior art, in which a flat-field optical element with the function of exchanging beam paths and inverting the image is additionally introduced into the beam path, in the microscope according to the invention there results no unnecessary lengthening of the microscope. The first and second flat-field optical elements can be rotated and/or moved into the beam path by the change-over device. Here, the invention is not limited to specific embodiments for the change-over device. The change-over device need only be able to selectively rotate or move the first or second flat-field optical element into the beam path. Several nonexclusive examples of advantageous change-over devices are explained in more detail in the further course of the description.

It is also conceivable that other flat-field optical elements can be introduced into the beam path by means of the change-over device.

The first flat-field optical element, which always remains in the beam paths of the microscope arrangement in known microscope arrangements of the prior art, is replaced according to the invention by a second flat-field optical element. The operating space is only minimally reduced by introducing the ophthalmoscopic lens or the indirect contact glass.

Advantageously, a tube for a microscope is further provided, in which a bending optical element is disposed in the tube, by means of which element the beam paths aligned by an objective, which is disposed in front of the tube, can be bent. In this way, the structural height of the microscope can be reduced. A bending optical element is generally a (flat-field) optical element, with which the course of a beam path can be changed. For example, a beam path running first in a specific direction can be bent or deflected relative to the prior course of the beam path by the bending optical element, at a specific angle, which depends on the configuration of the bending optical element. A bending optical element in microscopy is often used, for example, in order to change a beam path from a vertical or horizontal course to a course that is angled up or down, so that, for example, observation is improved.

An advantageous bending optical element can involve, for example, a deflecting prism, a deflecting prism system and the like.

The tube is usually disposed between the objective and an eyepiece arrangement, by means of which the observer can observe the object. The distance between eyepiece arrangement and object is reduced by the bending optical element in the tube. That is, the tube can assume a horizontal, an approximately horizontal, or an inclined position by means of the bending optical element, whereby the structural height of the microscope can be reduced. A tube with a bending optical element is particularly suitable also for another observer of the object, who can observe the object by means of another tube and a second eyepiece arrangement, since he will be spatially separated from the surgeon, due to the bending course of the microscope.

However, a horizontal, approximately horizontal, or inclined course of the tube in the microscope also creates for the surgeon a clear shortening of the distance between the eyepiece arrangement and the object. By this means, the surgeon has a greater latitude for manipulation. The bending optical element is advantageously disposed on the side of the tube turned toward the objective, so that an immediate deflection of the beam paths results here. The change-over device in the tube can be provided adjacent to the bending optical element. The beam paths aligned by the objective are bent by the bending optical element and introduced into the first or the second flat-field optical element. There also exists the possibility that the bending optical element is a component of the change-over device or is formed simply by this.

Ideally, the bending optical element is disposed at the edge of the tube. An immediate bending of the beam paths introduced by the objective results in this way.

A particularly preferred embodiment of the tube according to the invention provides that the first and the second flat-field optical elements include the bending optical element. This means that the first and the second flat-field optical elements are designed in such a way that they additionally bend the beam paths, so that the structural height of the microscope can be further reduced. The first flat-field optical element deflects the beam paths coming from the objective without exchanging the beam paths and inverting the image. The second flat-field optical element with the function of exchanging beam paths and inverting the image bends the beam paths, exchanges the beam paths and inverts the image. The structural height is further reduced by such a design of the microscope. This is effected first of all by the change-over device, and secondly, by the bending of the beam paths. The length of the tube can be clearly reduced by the combination of the flat-field optical elements and the bending optical element, so that the structural height or the width of the microscope is reduced.

Advantageously this is a tube in which the change-over device has a holding device, in particular a drum, on which the first and second flat-field optical elements are disposed and the holding device is mounted in a rotatable manner by means of or around a shaft or an axis, and/or is guided so that it can move along a track. The change-over device is provided inside the tube. The first and the second flat-field optical elements can be tilted and/or moved in such a way that they can be introduced into the beam paths. For this purpose, a holding device is advantageously provided onto which both both flat-field optical elements are fastened. This holding device sits in the tube in a movable manner. A shaft or an axis can be provided on which the holding device is disposed. Either the holding device can be rotated around the shaft or the axis or the shaft rotates the holding device. The holding device can thus be joined to the shaft in a rotation-resistant manner. The holding device can be a drum, which is rotated around the shaft or the axis. The two flat-field optical elements can thus be disposed on the drum, for example, displaced by 180°. The shaft or the holding device can be driven by a motor.

Further, a track or a track system can be provided, along which the holding device can be moved, so that either the first or the second flat-field optical element or an additional flat-field optical element can be introduced into the beam paths.

Preferably, the change-over device can be actuated by an actuation device, in particular a switch or a lever, which is disposed on the tube. In this way, the observer can simply introduce the desired flat-field optical element into the beam paths. The actuation device is coupled to the holding device or to the shaft, for example, by means of a motor or another mechanism. The actuation device can be disposed directly on the tube, but it can also be disposed at another place on the microscope.

In addition, a tube is preferred in which at least one pivotable or rotatable device is provided for variation of the viewing angle. In this way, the viewing angle can be changed, so that the observer can observe the entire object. The invention is not limited to specific configurations for the device. For example, it may involve a pivotable or rotatably mounted mirror, a prism link or the like.

A tube is preferred, in which the bending optical element includes at least one Bauernfeind prism, a 90° roof prism, a 90° roof mirror, a roof-type Schmidt prism, a penta prism and/or a double Bauernfeind prism. Of course, the invention is not limited to the named examples. In order to obtain a 90° bend, a double Bauernfeind prism is particularly well suitable. A 90° roof prism, a 90° roof mirror, or a roof-type Schmidt prism forms a bending optical element, each of which has a function of exchanging beam paths and inverting the image. Bauernfeind prisms, double Bauernfeind prisms and penta prisms are suitable for a bending optical element without the function of exchanging beam paths and inverting the image.

It is advantageous if the second flat-field optical element is a 90° roof prism, a 90° roof mirror or a roof-type Schmidt prism. Such prisms lead to a function of exchanging beam paths and inverting the image. They can be designed in such a way that they can bend one or more beam paths additionally for exchanging beam paths and inverting the image.

In addition, it is of advantage if the first flat-field optical element is a Bauernfeind prism, a double Bauernfeind prism or a penta prism. These prisms are then suitable, if the beam paths need not be exchanged and the image need not be inverted.

A tube, in which at least one round optical element and at least one additional flat-field optical element are provided for aligning the beam paths, represents another variant of the tube according to the invention. A round optical element generally involves an optical component which has two curved optical functional surfaces. The optical functional surfaces. It should be noted that a planar surface can be understood as a spherically curved surface with an "infinite" radius of curvature can be spherically curved, for example. With respect to the mode of operation of the functional surfaces, reference is made to the statements given above in regard to the flat-field optical elements. A round optical element can be designed, for example, in the shape of a biconvex, biconcave, convex-concave, piano-convex, piano-concave lens, a mirror or the like, wherein the invention is not limited, of course, to the named examples. Suitable materials for round optical elements are, for example, optical glasses, quartz glass, crystals, ceramics, plastics and the like.

These optical elements are advantageously disposed between the bending optical element and the eyepiece. The round element advantageously sits on the outermost end of the tube and guides the beam paths to the eyepiece arrangement. The additional flat-field optical element can be a flat-field optical element with or without the function of image inversion. A particularly suitable additional flat-field optical element is a rhombic prism, which does not have an image-inversion function. A Porro prism of the second type can be utilized as a suitable flat-field optical element with image-inversion function.

A microscope for observing an object or an intermediate image produced by an object, in particular in microsurgery, with an objective for aligning the beam bundle which is introduced from the object or the intermediate image to be observed, with optics, in particular an ophthalmoscopic lens or an indirect contact glass that can be introduced in the beam paths between objective and object, with at least one eyepiece arrangement by which the left and right beam paths introduced from the objective are introduced, for observing the object or the intermediate image, with at least one tube with flat-field optical elements for aligning the beam paths for at least one observer, with a first flat-field optical element for aligning the beam paths for the observation of the front segment of the object, with a second flat-field optical element with the function of exchanging the beam paths and inverting the image for aligning the beam paths for the observation of the intermediate image of the object, wherein the tube has the features at least of a tube described previously, represents a microscope that has a low structural height and that keeps at a nearly constant size the space between the object and the objective of the microscope. Further, the distance between the eyepiece arrangement and the object can be reduced by such a microscope, so that a surgeon obtains more room to maneuver in an operation.

A microscope is advantageous, in which the objective has a stationary lens, which is turned toward the object, and an adjustable lens, which is assigned to the side of the stationary lens, which is turned away from the object. The focal intercept can be reduced in this way. This also has the effect that the imaging quality is not adversely affected. The two-part construction of the objective can serve for equilibrating the refraction for ametropic or aphacic eyes. The equilibration of the refraction with a stationary lens and a movable lens is possible both with the use of an ophthalmoscopic lens as well as with the use of an indirect contact glass.

Advantageously, at least one intermediate lens can be provided between the tube and the objective. In this way, for example, in a microscope with two observation pathways, one of the observation pathways can be provided for the assistant with intermediate lenses, which can have a zoom function, but also a function of inverting the image or a function of exchanging beam paths and inverting the image.

The details described for the tube apply also to the microscope and vice versa.

Additional details and advantages of the tube and of the microscope according to the invention result from the following description and the drawings belonging thereto, in which preferred embodiments with the details necessary for this purpose are shown. Here:

FIG. 2 shows a top view onto a tube of the microscope according to FIG. 1;

FIG. 4 shows a top view onto a tube of the microscope according to FIG. 3;

Figure 1:
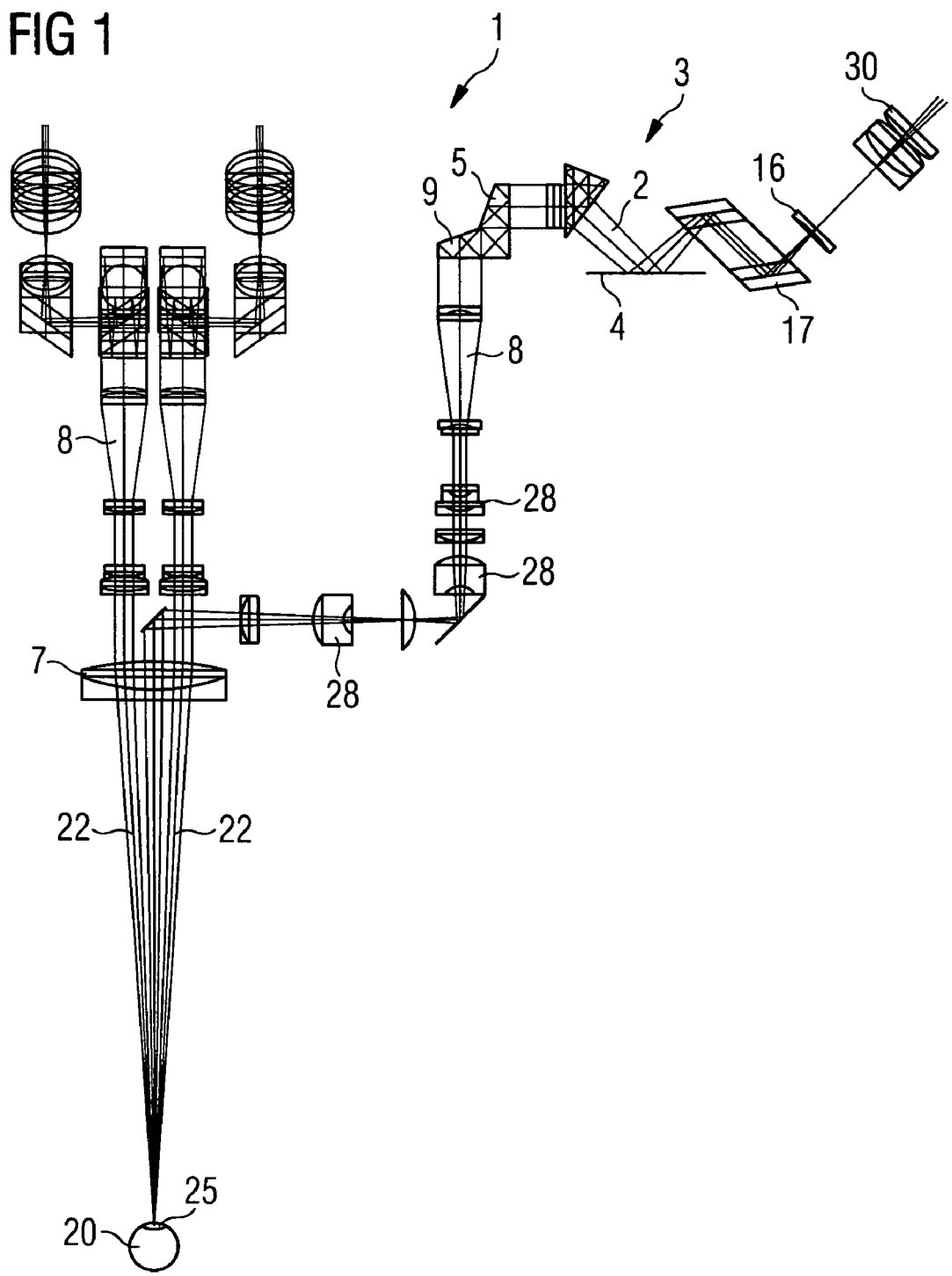
FIG. 1 shows a microscope according to the invention with two pairs of observation channels with a bending optical element and a first flat-field optical element.

FIGS. 1 and 2 show a microscope 1 according to the invention, which is provided for use for operation on an eye 20, with a tube 3 according to the invention. FIG. 2 shows a top view onto the tube 3 shown in FIG. 1. Microscope 1 has two pairs of observation channels, by means of which both a first observer, the surgeon, as well as a second observer can observe the eye 20. The observation of the front region of the eye is shown in these Figures. The beam bundles 22 proceeding from eye 20 strike the objective 7 and are aligned therein. The beam paths 8 running from the objective 7 are introduced into tube 3. The beam paths 8 introduced from the objective first reach the bending optical element 9 in tube 3. This element represents simultaneously the first flat-field optical element 5, which does not have an exchanging and image-inverting function in the example. The beam paths 2 are deflected via a rotatable or pivotable device for variation of the viewing angle, which is formed in the present example as a tiltable mirror 4, and are introduced into another flat-field optical element 17. The flat-field optical element 17 can be designed differently for the first observer (e.g., the surgeon) and for the second observer (e.g., the assistant). Several non-exclusive examples of this are explained further below in connection with FIGS. 5 to 12.

After the other flat-field optical element 17, the beam paths 2 pass through a round optical element 16 and reach the eyepiece arrangement 30, by means of which the observer looks into the microscope 1. Intermediate lenses 28, which are suitable for zooming, are disposed between the objective 7 and the tube 3. The intermediate lenses 28 can be designed in such a way that they include a function of inverting the image or a function of exchanging beam paths and inverting the image. These are often present, however, only in the observation channel of the second observer.

Figure 3:
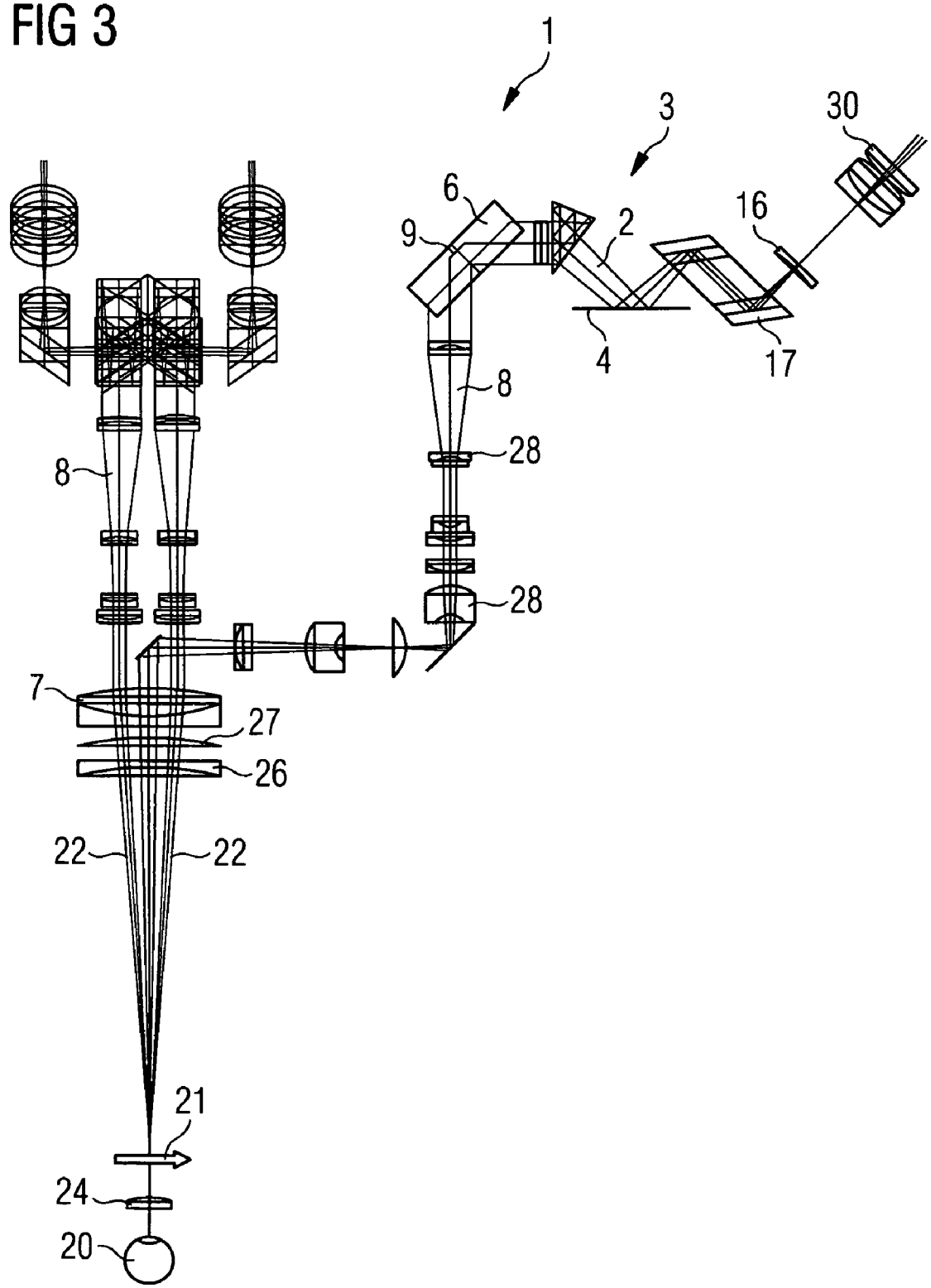
FIG. 3 shows a microscope according to the invention with two pairs of observation channels with a bending optical element and a second flat-field optical element.

FIGS. 3 and 4 also show a microscope 1 according to the invention. FIG. 4 in turn shows a top view onto the tube 3 shown in FIG. 3. In FIGS. 3 and 4, the microscope 1 is constructed for observation of the back region of the eye, of the so-called fundus. An optical component 24 has been introduced directly in front of the object, i.e., the eye 20. This optical component 24, an ophthalmoscopic lens or an indirect contact glass, can be rotated or moved into the beam path 22 between the eye 20 and the objective 7. After optical component 24, a rotated intermediate image 21 is formed from the back region of the eye. The beam paths 8 introduced to the tube 3 from the objective 7 are pupil-exchanged and rotated. The bending element 9 is in turn simultaneously a flat-field optical element. In this case, the flat-field optical element is the second flat-field optical element 6 with the function of exchanging beam paths and inverting the image. The beam paths 2 have been pupil-exchanged and rotated so that they are introduced into eyepiece arrangement 30 by means of the mirror 4, by the flat- field optical element 17 and the round optical element 16. The observer thus sees a normal image of the back region of the eye. The objective 7 has two lenses, i.e., a stationary lens 26 and an adjustable lens 27. By adjusting the adjustable lens 27, an equilibration of the refraction for an ametropic or aphacic eye can be carried out. The focal intercept can be changed by the adjustable lens 27.

By means of the tube 3 according to the invention, it is possible to selectively swing into the beam path 8, different flat-field optical elements, e.g., the first flat-field optical element 5 without the function of exchanging beam paths and inverting the image as well as the second flat-field optical element 6 with the function of exchanging beam paths and inverting the image.

This selection is conducted by means of a suitable change-over device 40. An advantageous embodiment of such a change-over device 40 is shown in FIG. 19.

Figure 19:
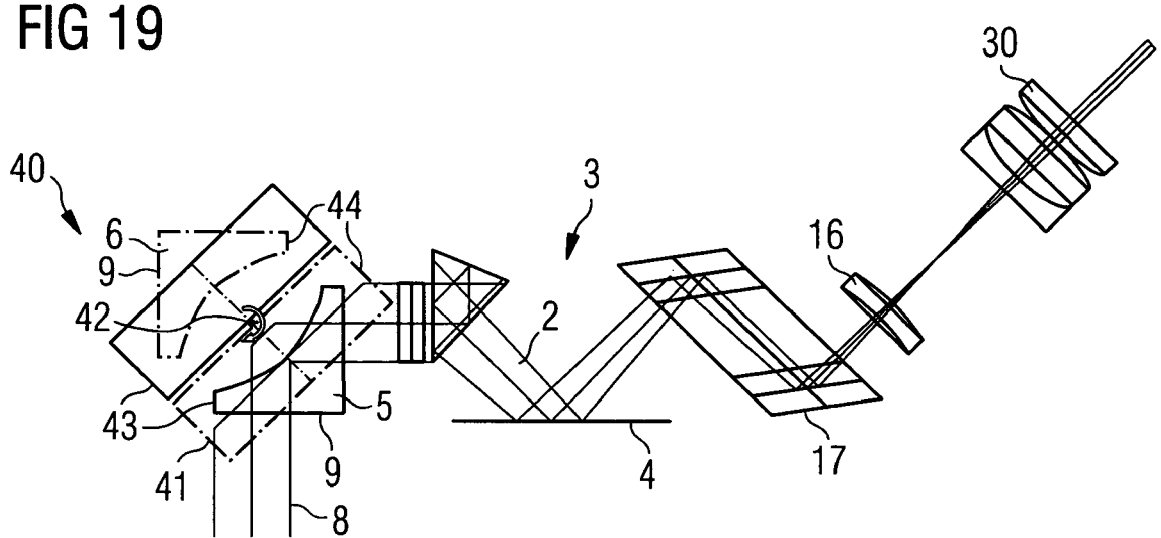
FIG. 19 shows a tube with a change-over device for introducing desired flat-field optical elements into the beam path.

FIG. 19 first shows a tube 3, as it is also shown in FIGS. 1 to 4, so that reference is first made to the above statements relative to its basic structure as well as functioning. The tube 3 shown in FIG. 19 additionally has the change-over device 40. This latter provides a holding device 41 for flat-field optical elements, which device is formed as a drum, whereby the holding device 41 is mounted so that it can rotate around an axis 42, which can be recognized in the figure by a corresponding arrow. Two bending optical elements 9 in the form of flat-field optical elements are arranged on the holding device; one flat-field optical element is designed as a first flat-field optical element 5 without the function of exchanging beam paths and inverting the image, while the other flat-field optical element is designed as a second flat-field optical element 6 with a function of exchanging beam paths and inverting the image.

It can be provided, for example, in a first position 43 of the change-over device 40 or the holding device 41, respectively, that the first flat-field optical element 5 without the function of exchanging beam paths and inverting the image is rotated into the beam path 8. Now, if the change-over device 40 or the holding device 41, respectively, is tilted into a second position by rotating the holding device 41 in corresponding manner around the axis 42, the first flat-field optical element 5 is rotated out from beam path 8 and at the same time, the second flat-field optical element 6 with the function of exchanging beam paths and inverting the image is rotated into beam path 8.

Tubes 3 of the microscope 1 shown in FIGS. 1 to 4 can be designed advantageously in an indentical structural manner or at least substantially in an indentical structural manner for the first observer and for the second observer, so that the description of the tube 3, which was directed primarily to the pair of observation channels for the second observer in the above-named figures, also applies in an identical manner to the tube for the pair of observation channels for the first observer.

A difference between the tubes for the pairs of observation channels of the first and second observers, however, can be present in the configuration of the additional flat-field optical element 17. The design of this flat-field optical element 17 will be explained below on the basis of FIGS. 5 to 12.

Each of FIGS. 5 to 12 shows a different tube 3 according to the invention.

Figure 5:
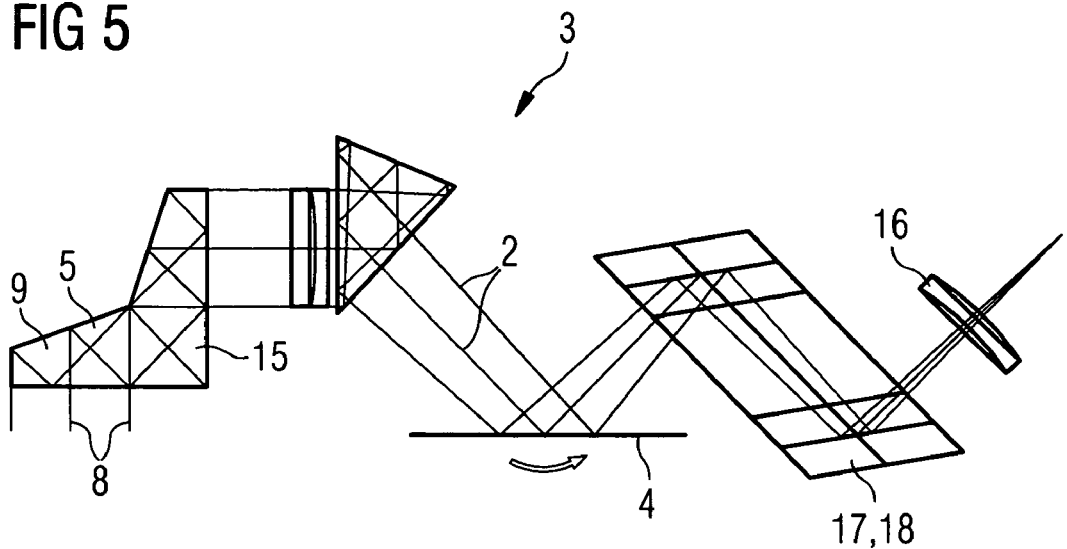
FIG. 5 shows a tube without a prism with image-inverting function.

FIG. 5 shows a bending optical element 9, which is simultaneously a component of the first flat-field optical element 5. The flat-field optical element 5 is designed as a double Bauernfeind prism 15. The first flat-field optical element 5 is disposed on a holding device (which is not shown) of the change-over device according to the invention. The image is not inverted in this tube 3. For this purpose, the flat-field optical element 17 is designed as a rhombic prism 18. The beam paths 2 run differently in FIG. 6. Here, due to the additional flat-field optical element 17, in this case, a Porro prism of the second type 19, the image is inverted.

Figure 6:
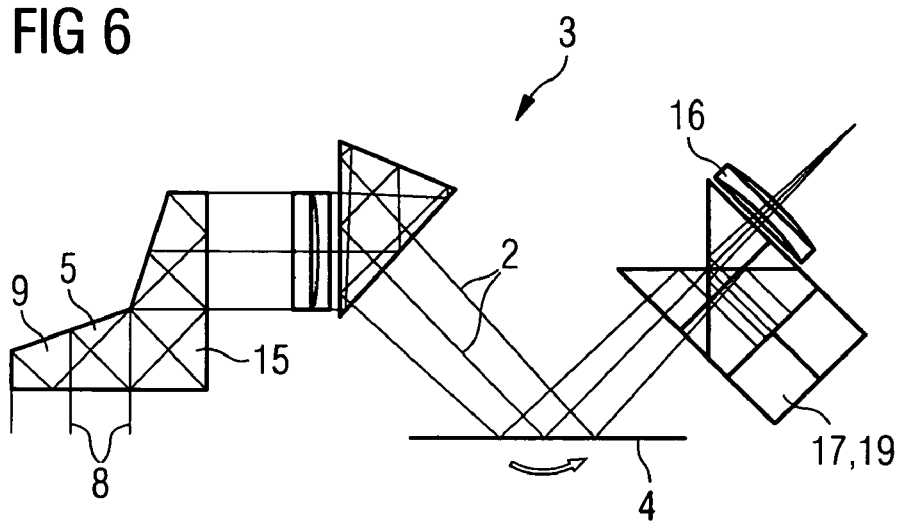
FIG. 6 shows a tube with a prism with image-inverting function.

In FIGS. 5 and 6, as well as in FIGS. 7 to 10, at least one mirror 4 is provided for changing the viewing angle.

Figure 7:
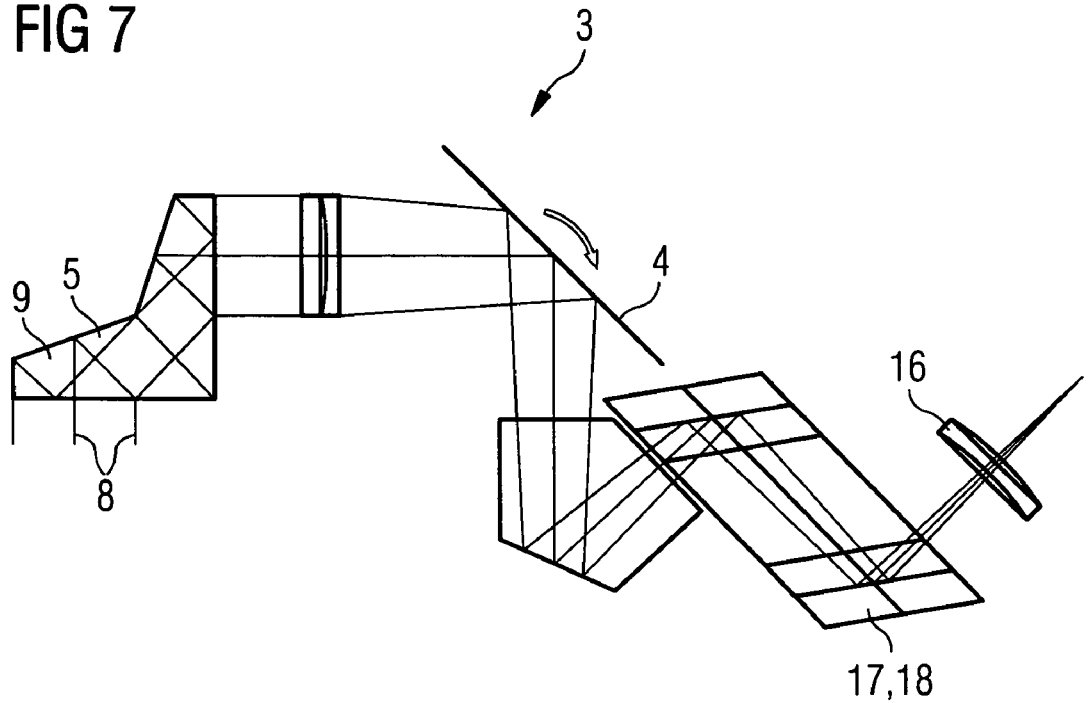
FIG. 7 shows a tube without a prism with image-inverting function.
Figure 8:
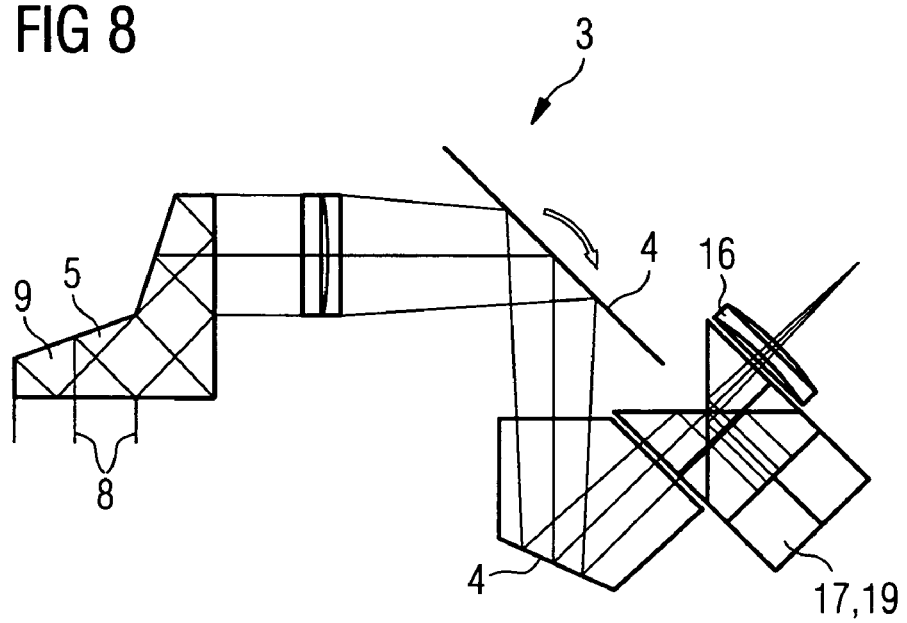
FIG. 8 shows a tube with a prism with image-inverting function.

FIGS. 7 and 8 show similar tubes 3, except that the flat-field optical element 17 or the one or more mirrors 4, respectively, are disposed differently.

Figure 9:
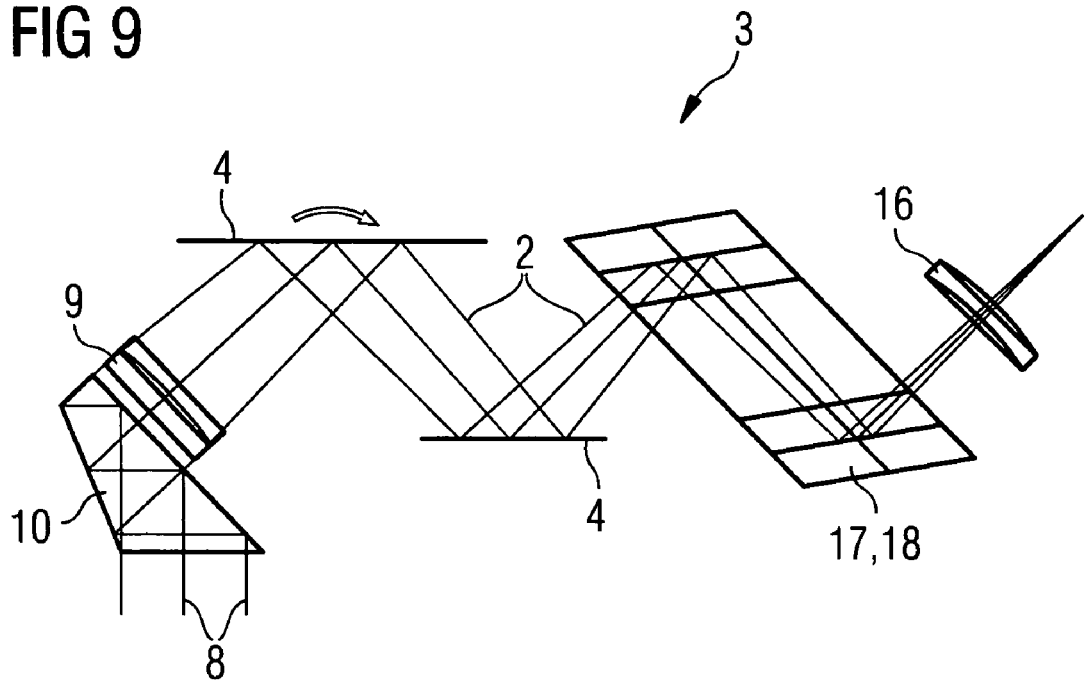
FIG. 9 shows a tube without a prism with image-inverting function.
Figure 10:
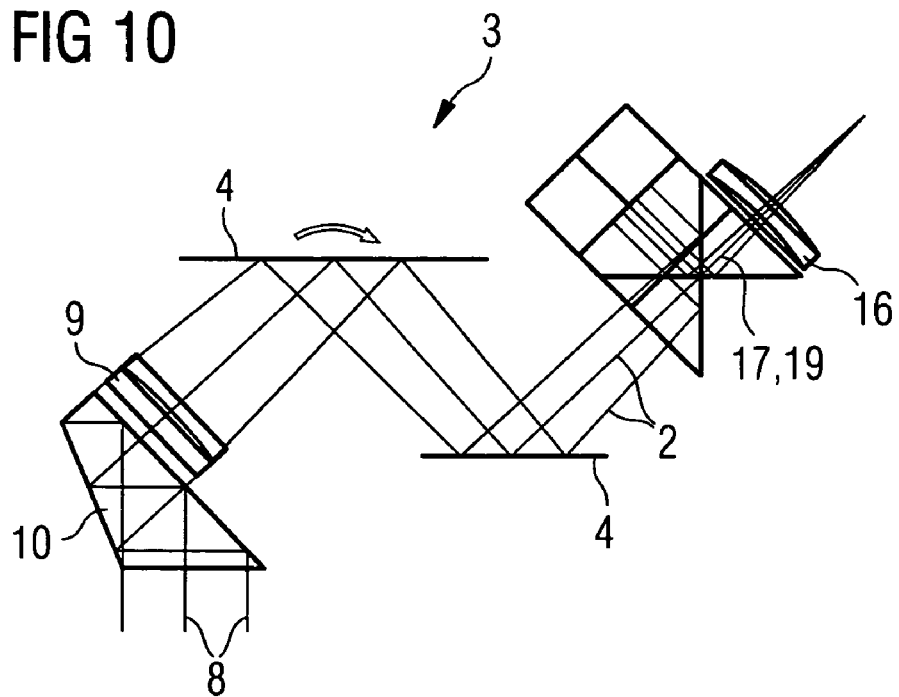
FIG. 10 shows a tube with a prism with image-inverting function.

Each of FIGS. 9 and 10 shows a tube 3 with a Bauernfeind prism 10 on the first part of tube 3. Beam paths 8 are not deflected by 90° or a similarly large angle, but rather by a smaller angle, by this Bauernfeind prism 10. Further deflection is produced via mirrors 4, which are disposed in tube 3. FIG. 9 shows another flat-field optical element 17 without image-inversion function in the form of a rhombic prism 18. FIG. 10 shows another flat-field optical element 17 with image-inversion function in the form of a Porro prism of the second type 19.

Figure 11:
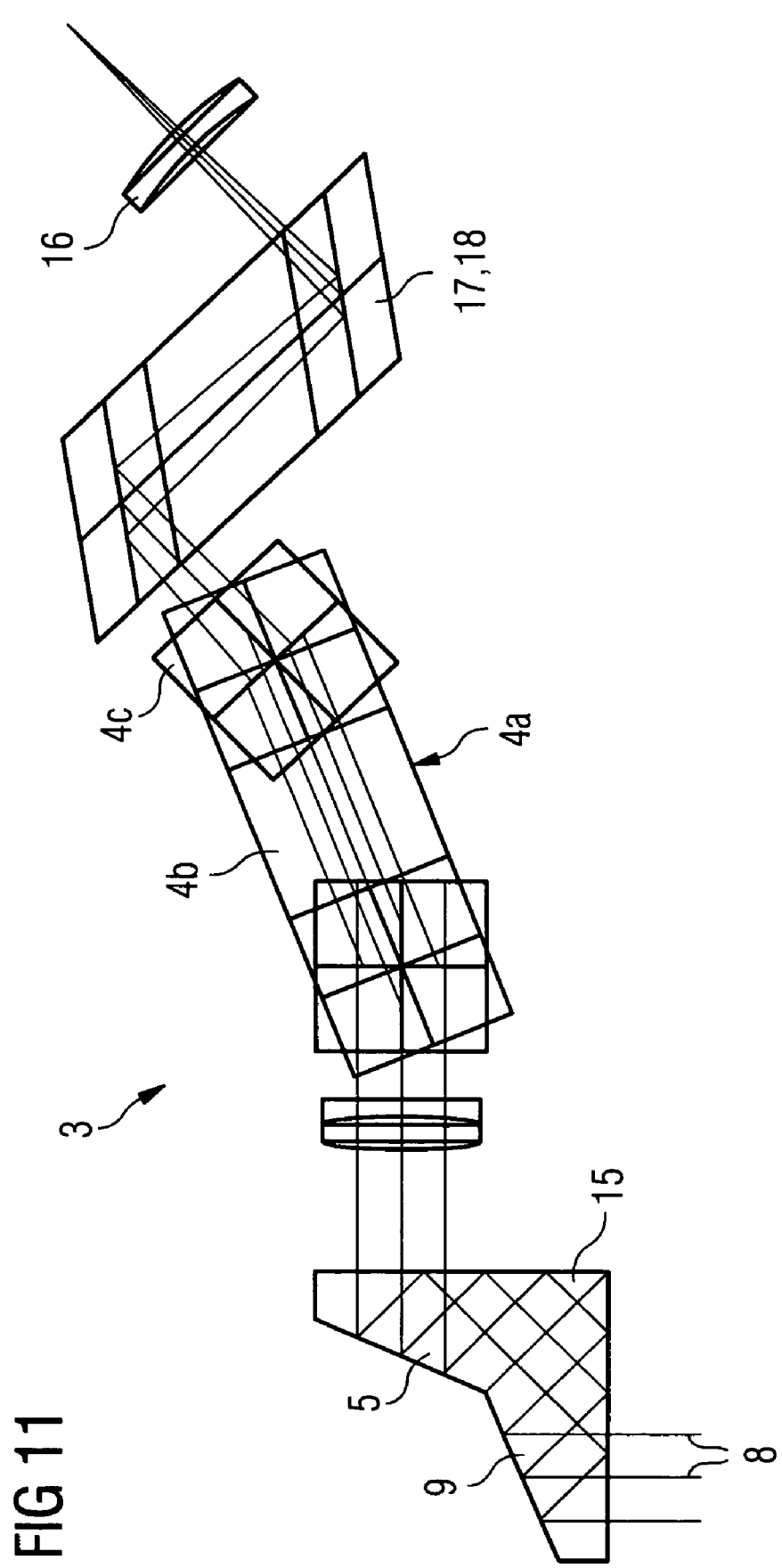
FIG. 11 shows a tube with a prism link and without a prism with image-inverting function.
Figure 12:
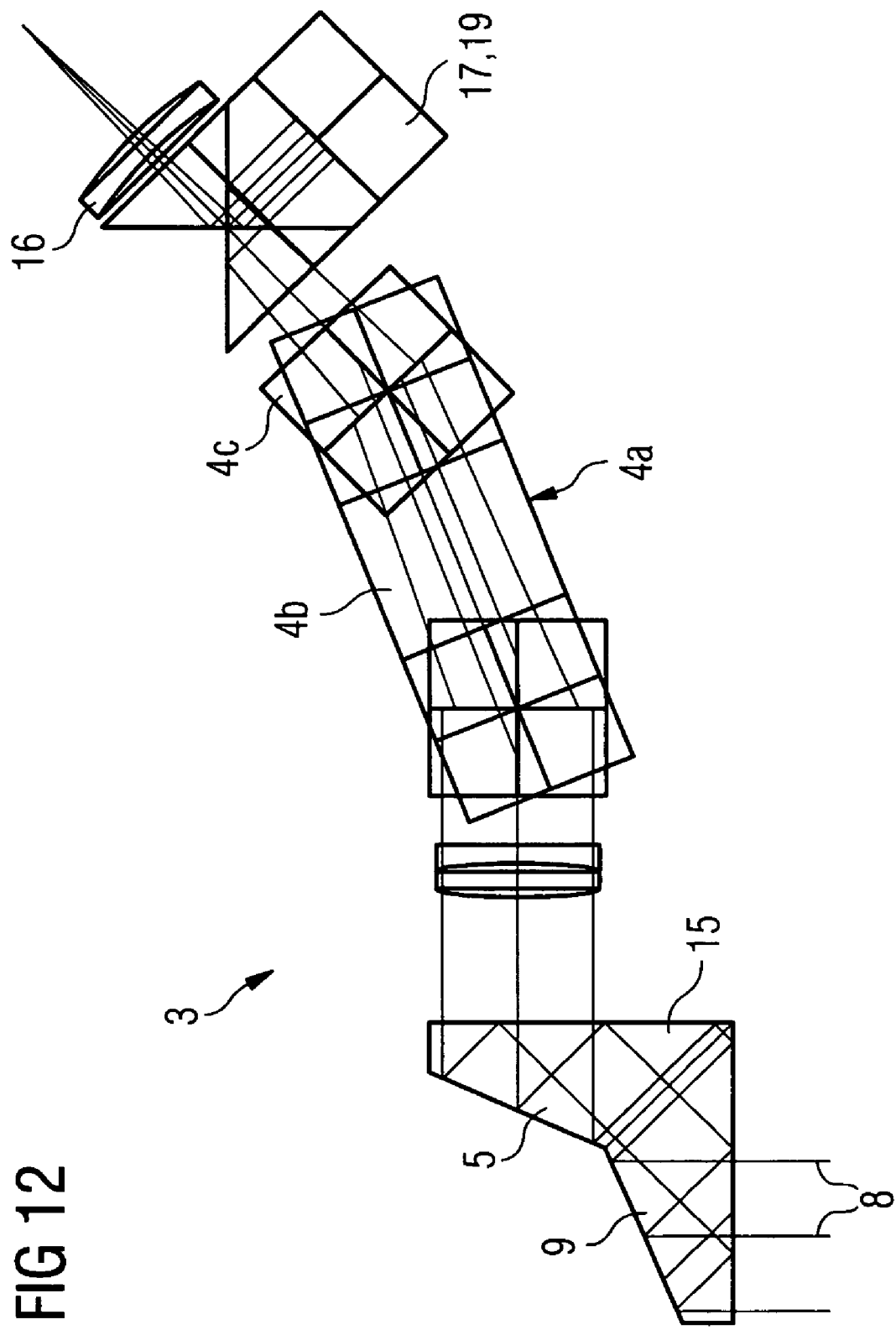
FIG. 12 shows a tube with a prism link and with a prism with image-inverting function.

In FIGS. 11 and 12, representations of tubes 3 are shown, which correspond in their basic structure to the tubes 3 shown in FIGS. 5 and 6, so that reference is first made to the above statements in this regard. Unlike the examples shown above, tube 3 according to FIGS. 11 and 12, however, does not have one or more mirrors as a device for varying the viewing angle, but rather a prism link 4a. The prism link 4a is comprised of a prism 4b that can be rotated 180° as well as another prism 4c, which can be rotated by the same angle as the 180° prism 4b.

Different examples of flat-field optical elements 5,6 are shown in FIGS. 13 to 18.

Figure 13:
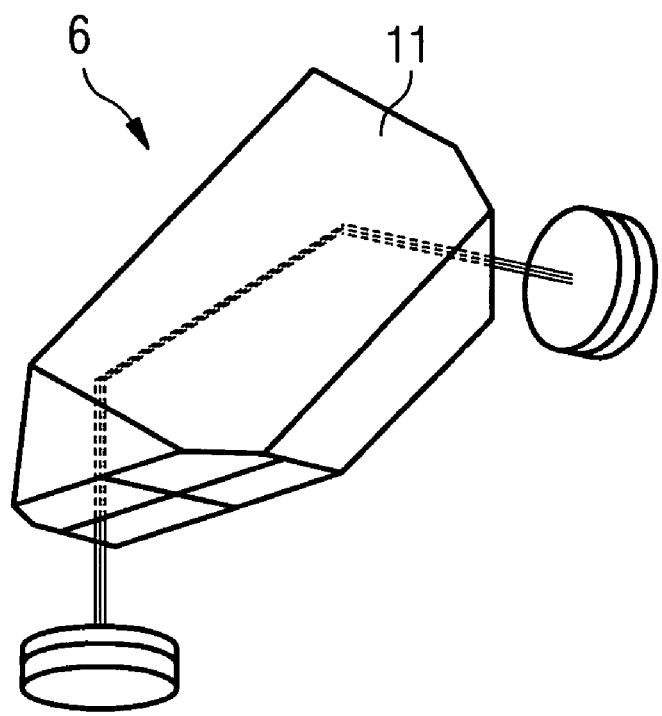
FIG. 13 shows a 90° roof prism with an exchanging and image-inverting function.
Figure 14:
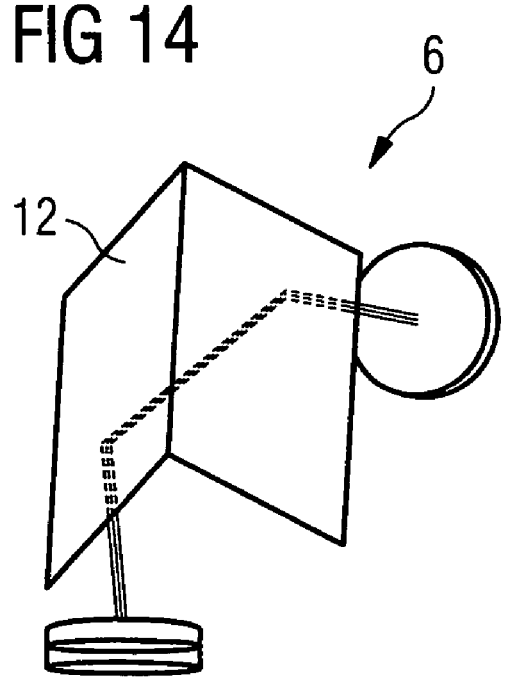
FIG. 14 shows a 90° roof mirror with an exchanging and image-inverting function.
Figure 15:
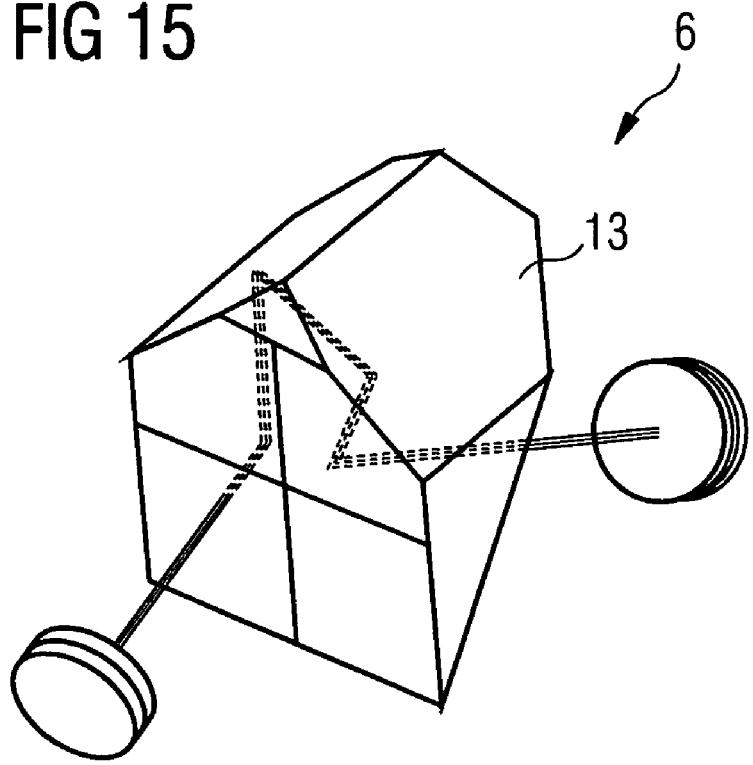
FIG. 15 shows a roof-type Schmidt prism with an exchanging and image-inverting function.

Second flat-field optical elements, which have a function of exchanging and inverting the image, are shown in FIGS. 13 to 15. FIG. 13 shows a 90° roof prism 11, FIG. 14 shows a 90° roof mirror 12 and FIG. 15 shows a roof-type Schmidt prism 13.

Figure 16:
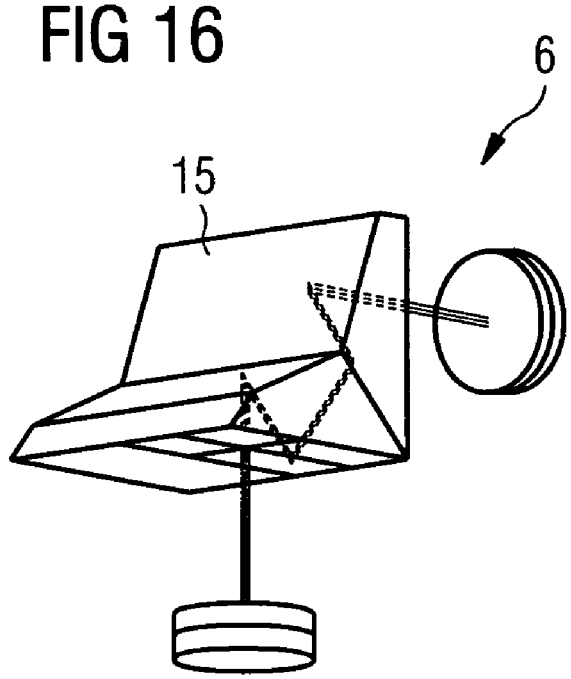
FIG. 16 shows a double Bauernfeind prism without an exchanging and image-inverting function.
Figure 17:
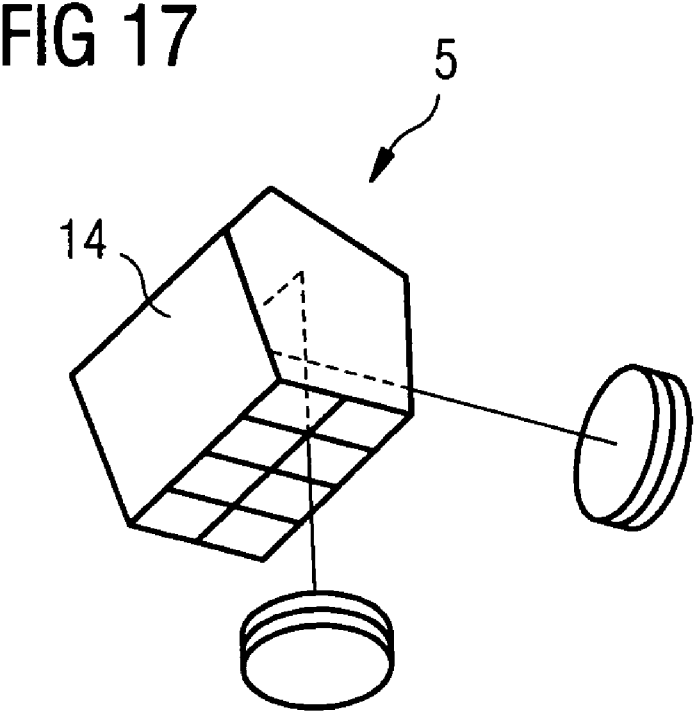
FIG. 17 shows a penta prism without an exchanging and image-inverting function.
Figure 18:
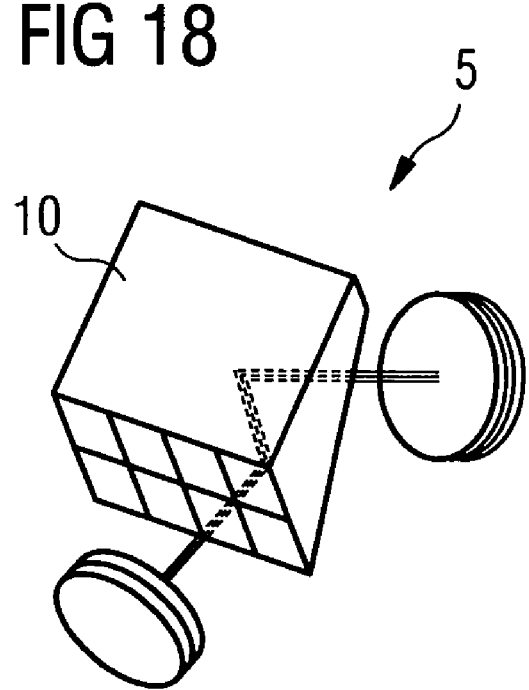
FIG. 18 shows a Bauernfeind prism without an exchanging and image-inverting function.

First flat-field optical elements 5 without the function of exchanging and inverting the image are shown in FIGS. 16 to 18. FIG. 16 shows a double Bauernfeind prism 15, FIG. 17 shows a penta prism 14 and FIG. 18 shows a Bauernfeind prism 10. A first flat-field optical element and a second flat-field optical element 5, 6 each sit on the holding device of the change-over device. In this way, they can be freely combined.

What is claimed is:

1. A tube for a microscope, in which at least two beam paths are provided, is hereby characterized in that a change-over device is provided in the tube, wherein the change-over device has a rotating axis which is arranged perpendicular to the beam paths aligned by an objective, by means of which device a first flat-field optical element and a second flat-field optical element, both of said first flat-field optical element and said second flat-field optical element being present, are alternately switched into or out of each beam path of the beam paths aligned by an objective, for aligning the beam paths for an observer, wherein the second flat-field optical element has a function of exchanging the beam paths and inverting the image, wherein the first flat-field optical element does not exchange the beam paths and does not invert the image, and wherein the first flat-field optical element and the second flat-field optical element comprise a bending element, by means of which the beam paths aligned by an objective can be bent in such a way that, when the first flat-field optical element is switched into the beam paths, the beam paths are bent in an angle >0° after passing the first flat-field optical element and when the second flat-field optical element is switched into the beam paths, the beam paths are bent in an angle >0° after passing the second flat-field optical element.

2. The tube according to claim 1, further characterized in that the bending optical element, by means of which the beam paths aligned by an objective, which is disposed in front of tube, can be bent, is disposed in the tube.

3. The tube according to claim 2, further characterized in that the bending optical element is disposed at the edge of the tube.

4. The tube according to claim 2, further characterized in that at least one additional flat-field optical element or at least one round optical element and at least one additional flat-field optical element is provided for the alignment of beam paths.

5. The tube according to claim 4, further characterized in that the at least one additional flat-field optical element includes a rhombic prism.

6. The tube according to claim 4, further characterized in that the at least one other flat-field optical element includes a Porro prism of the second type.

7. The tube according to claim 2, further characterized in that at least one round optical element is provided for the alignment of beam paths.

8. The tube according to claim 1, further characterized in that the change-over device has a holding device on which the first and second flat-field optical elements are disposed and the holding device is mounted in a rotatable manner by means of or around a shaft or an axis, and/or is guided so that it can move along a track.

9. The tube according to claim 1, further characterized in that the change-over device can be actuated by an actuation device which is disposed on the tube.

10. The tube according to claim 1, further characterized in that in the tube at least one pivotable or rotatable device is provided for variation of the viewing angle.

11. The tube according to claim 10, further characterized in that the device for variation of the viewing angle is formed as at least one mirror mounted so that it can be pivoted or rotated and/or as a prism link.

12. The tube according to claim 2, further characterized in that the bending optical element includes at least a Bauernfeind prism, a 90° roof prism, a 90° roof mirror, a roof-type Schmidt prism, a penta prism and/or a double Bauernfeind prism.

13. The tube according to claim 1, further characterized in that the second flat-field optical element is a 90° roof prism, a 90° roof mirror or a roof-type Schmidt prism.

14. The tube according to claim 1, further characterized in that the first flat-field optical element is a Bauernfeind prism, a double Bauernfeind prism or a penta prism.

15. A microscope for observing an object or an intermediate image produced by an object, in particular in microsurgery, comprising: an objective for aligning the beam bundle which is introduced from the object or the intermediate image to be observed, an optical component, in particular an ophthalmoscopic lens or an indirect contact glass, which can be introduced in the beam paths between objective and object; at least one eyepiece arrangement by which the left and right beam paths introduced by the objective are introduced, for observing the object or the intermediate image, at least one tube having at least one flat-field optical element for aligning the beam paths for at least one observer; a first flat-field optical element for aligning the beam paths for observing the front segment of the object; a second flat-field optical element with the function of exchanging the beam paths and inverting the image for aligning the beam paths for observing the intermediate image of the object; is hereby characterized in that the tube has the features of any one of claims 1 to 14.

16. The microscope according to claim 15, further characterized in that the objective has a stationary lens, which is turned toward the object, and an adjustable lens, which is assigned to the side of the stationary lens, which is turned away from the object.

17. The microscope according to claim 15, further characterized in that at least one intermediate lens is provided between the tube and the objective.

18. The tube according to claim 1, wherein one of the first and second flat-field optical elements is always switched into each beam path.

19. The tube according to claim 1, wherein the holding device is driven by a motor.

20. The tube according to claim 1, wherein the angle of the beam paths after passing the first flat-field optical element is the same as the angle of the beam paths after passing the second flat-field optical element.

21. The tube according to claim 1, wherein the first flat-field optical element comprises an even-numbered number of reflections and wherein the second flat-field optical element is a 90° roof prism and comprises an odd-numbered number of reflections and a roof surface with a function of exchanging beam paths and inverting the image.

* * * * *